United States Patent [19]

Suzuki

[11] Patent Number: 4,959,793

[45] Date of Patent: Sep. 25, 1990

[54] MICROCOMPUTER HAVING FUNCTION OF GENERATING DATA SIGNALS USED FOR DISPLAYING CHARACTERS

[75] Inventor: Hiroyuki Suzuki, Tokyo, Japan

[73] Assignee: NEC Corporation, Tokyo, Japan

[21] Appl. No.: 184,567

[22] Filed: Apr. 21, 1988

[30] Foreign Application Priority Data

Apr. 22, 1987 [JP] Japan ................................ 62-100502

[51] Int. Cl.[5] ................................................ G06F 13/00

[52] U.S. Cl. ...................................... 364/900; 364/238; 364/243; 364/243.3

[58] Field of Search ................................. 364/200, 900

[56] References Cited

U.S. PATENT DOCUMENTS 4,164,787 8/1979 Aranguren .......................... 364/200

4,264,954 4/1981 Briggs et al. ........................ 364/200

4,390,943 6/1983 Twibell et al. ...................... 364/200

4,443,846 4/1984 Adcock .............................. 364/200

*Primary Examiner*—David Y. Eng

*Attorney, Agent, or Firm*—Foley & Lardner, Schwartz, Jeffery, Schwaab, Mack, Blumenthal & Evans

[57] ABSTRACT

A microcomputer generates signals representative of character data. The character data are stored in a second area of a first memory which also has a first area storing a program. When character display information is generated, the second area of the first memory is cyclically made access to read the character data therefrom. The character data read from the first memory are stored temporarily into a second memory. The character data stored in the second memory is transferred to a shift register in response to a character output command signal and then outputted in response to a shift clock pulse.

10 Claims, 9 Drawing Sheets

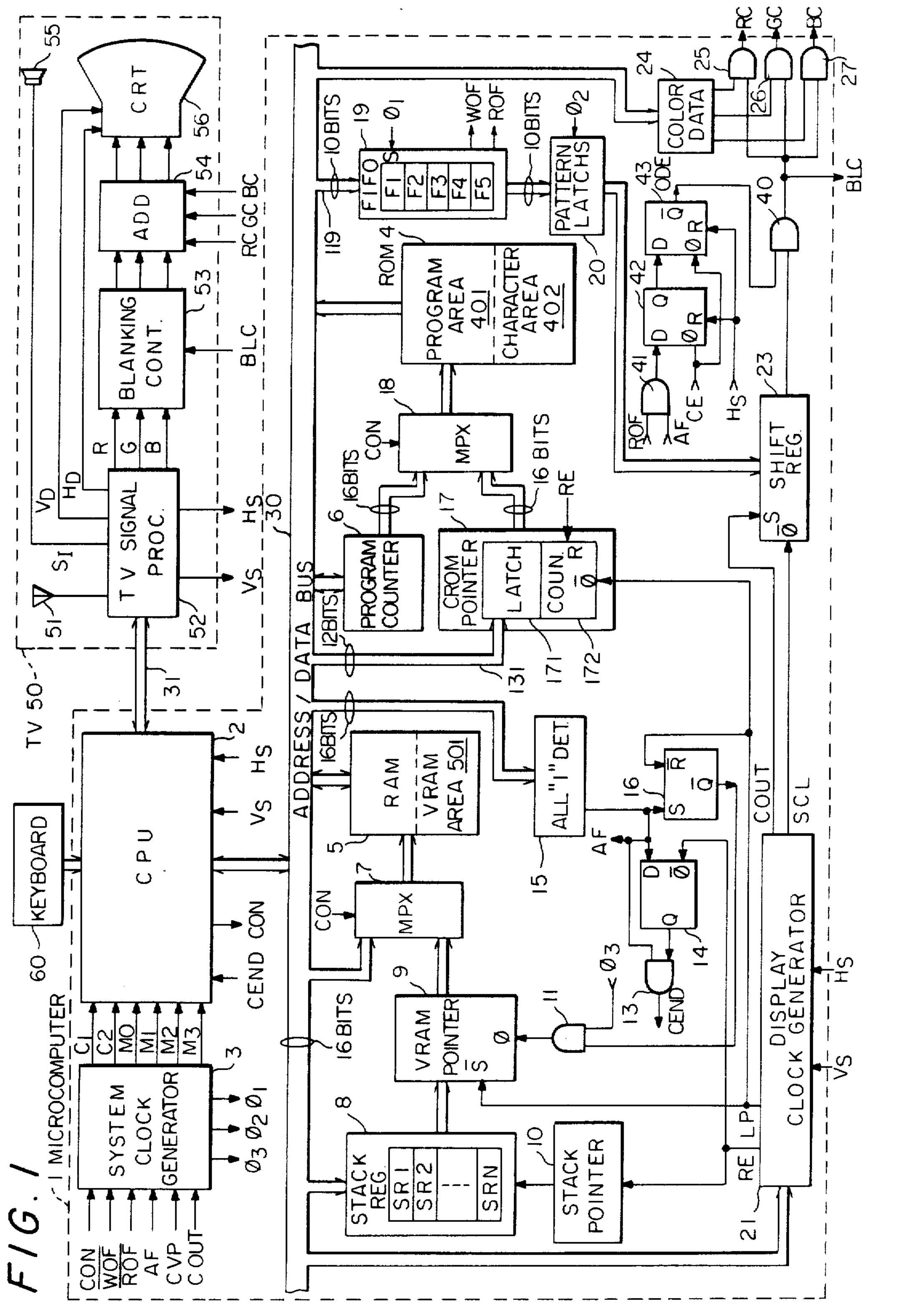
FIG. 1
TV 50
CRT
55
56
54
ADD
RC GC BC
53
BLANKING CONT.
BLC
R
G
B
VD
HD
T V SIGNAL PROC.
SI
51
52
HS
VS
30
31
1 MICROCOMPUTER
2
CPU
KEYBOARD
60
CEND CON
3
SYSTEM CLOCK GENERATOR
C1 C2 M0 M1 M2 M3
Ø3 Ø2 Ø1
CON
WOF
ROF
AF
CVP
COUT
ADDRESS / DATA BUS
10 BITS
19
Ø1
FIFO
F1 F2 F3 F4 F5
119
WOF
ROF
Ø2
PATTERN LATCHS
20
ROM 4
PROGRAM AREA 401
CHARACTER AREA 402
24
COLOR DATA
25
26
27
RC
GC
BC
43
ODE
D Q̄ ØR
42
D Q ØR
40
41
CE
HS
23
SHIFT REG.
S Ø
18
MPX
16 BITS
6
PROGRAM COUNTER
12 BITS
17
RE
CROM POINTER
LATCH
COUN
R
Ø̄
131
171
172
16BITS
RAM
VRAM AREA 501
5
ALL "1" DET.
15
16
S R̄ Q̄
AF
D Ø̄ Q
14
13
CEND
7
9
VRAM POINTER
S̄ Ø
11
8
STACK REG.
SR1 SR2 SRN
10
STACK POINTER
COUT
SCL
DISPLAY CLOCK GENERATOR
RE LP
21

FIG. 2

| | (MSB) 16 | | | | | | 10 | | | | | | | | | 1 (LSB) |
|---|---|---|---|---|---|---|---|---|---|---|---|---|---|---|---|---|
| 1100(H) | X | X | X | X | X | X | 0 | 0 | 1 | 1 | 1 | 1 | 1 | 1 | 0 | 0 |
| 1101(H) | X | X | X | X | X | X | 0 | 1 | 1 | 1 | 1 | 1 | 1 | 1 | 1 | 0 |
| 1102(H) | X | X | X | X | X | X | 1 | 1 | 1 | 0 | 0 | 0 | 0 | 1 | 1 | 1 |
| 1103(H) | X | X | X | X | X | X | 1 | 1 | 0 | 0 | 0 | 0 | 0 | 0 | 1 | 1 |
| 1104(H) | X | X | X | X | X | X | 1 | 1 | 0 | 0 | 0 | 0 | 0 | 0 | 1 | 1 |
| 1105(H) | X | X | X | X | X | X | 1 | 1 | 0 | 0 | 0 | 0 | 0 | 0 | 1 | 1 |
| 1106(H) | X | X | X | X | X | X | 1 | 1 | 0 | 0 | 0 | 0 | 0 | 0 | 1 | 1 |
| 1107(H) | X | X | X | X | X | X | 1 | 1 | 0 | 0 | 0 | 0 | 0 | 0 | 1 | 1 |
| 1108(H) | X | X | X | X | X | X | 1 | 1 | 0 | 0 | 0 | 0 | 0 | 0 | 1 | 1 |
| 1109(H) | X | X | X | X | X | X | 1 | 1 | 0 | 0 | 0 | 0 | 0 | 0 | 1 | 1 |
| 110A(H) | X | X | X | X | X | X | 1 | 1 | 0 | 0 | 0 | 0 | 0 | 0 | 1 | 1 |
| 110B(H) | X | X | X | X | X | X | 1 | 1 | 0 | 0 | 0 | 0 | 0 | 0 | 1 | 1 |
| 110C(H) | X | X | X | X | X | X | 1 | 1 | 1 | 0 | 0 | 0 | 0 | 1 | 1 | 1 |
| 110D(H) | X | X | X | X | X | X | 0 | 1 | 1 | 1 | 1 | 1 | 1 | 1 | 1 | 0 |
| 110E(H) | X | X | X | X | X | X | 0 | 0 | 1 | 1 | 1 | 1 | 1 | 1 | 0 | 0 |
| 110F(H) | X | X | X | X | X | X | 0 | 0 | 0 | 0 | 0 | 0 | 0 | 0 | 0 | 0 |
| 1110(H) | X | X | X | X | X | X | 0 | 0 | 0 | 1 | 1 | 1 | 0 | 0 | 0 | 0 |
| 1111(H) | X | X | X | X | X | X | 0 | 0 | 0 | 1 | 1 | 1 | 0 | 0 | 0 | 0 |
| 1112(H) | X | X | X | X | X | X | 0 | 0 | 0 | 1 | 1 | 1 | 0 | 0 | 0 | 0 |
| 1113(H) | X | X | X | X | X | X | 0 | 0 | 0 | 0 | 1 | 1 | 0 | 0 | 0 | 0 |
| 1114(H) | X | X | X | X | X | X | 0 | 0 | 0 | 0 | 1 | 1 | 0 | 0 | 0 | 0 |
| 1115(H) | X | X | X | X | X | X | 0 | 0 | 0 | 0 | 1 | 1 | 0 | 0 | 0 | 0 |
| 1116(H) | X | X | X | X | X | X | 0 | 0 | 0 | 0 | 1 | 1 | 0 | 0 | 0 | 0 |
| 1117(H) | X | X | X | X | X | X | 0 | 0 | 0 | 0 | 1 | 1 | 0 | 0 | 0 | 0 |
| 1118(H) | X | X | X | X | X | X | 0 | 0 | 0 | 0 | 1 | 1 | 0 | 0 | 0 | 0 |
| 1119(H) | X | X | X | X | X | X | 0 | 0 | 0 | 0 | 1 | 1 | 0 | 0 | 0 | 0 |
| 111A(H) | X | X | X | X | X | X | 0 | 0 | 0 | 0 | 1 | 1 | 0 | 0 | 0 | 0 |
| 111B(H) | X | X | X | X | X | X | 0 | 0 | 0 | 0 | 1 | 1 | 0 | 0 | 0 | 0 |
| 111C(H) | X | X | X | X | X | X | 0 | 0 | 0 | 0 | 1 | 1 | 0 | 0 | 0 | 0 |
| 111D(H) | X | X | X | X | X | X | 0 | 0 | 1 | 1 | 1 | 1 | 1 | 1 | 0 | 0 |
| 111E(H) | X | X | X | X | X | X | 0 | 0 | 1 | 1 | 1 | 1 | 1 | 1 | 0 | 0 |
| 111F(H) | X | X | X | X | X | X | 0 | 0 | 0 | 0 | 0 | 0 | 0 | 0 | 0 | 0 |

MICROCOMPUTER HAVING FUNCTION OF GENERATING DATA SIGNALS USED FOR DISPLAYING CHARACTERS

BACKGROUND OF THE INVENTION

The present invention relates to a microcomputer which controls an apparatus equipped with a raster scan type cathode ray tube (hereinafter simply called "CRT"), and more particularly to a one-chip microcomputer generating data signals to be used for displaying numerals, letters, symbols, etc. (hereinafter called collectively "characters") on the CRT.

A microcomputer, when employed to control a television receiver, has a variety of functions such as a digital tuning function of receiving a selected broadcasting station wave by means of PLL (Phase Locked Loop) frequency synthesizer technique or voltage synthesizer technique, a volume control function of increasing or decreasing a sound volume and a timer function of setting a time point at which a power switch of the television receiver is turned ON or OFF. For television receivers which display characters such as a selected channel number on the CRT along with video pictures, the microcomputer has a function of generating data signals of characters to be displayed. For that purpose, the microcomputer is provided with a character memory which stores data of each character to be displayed and a video memory which stores address information of the characters in the character memory to make access to the character data to be displayed. In order to display the characters at a desired position on the display screen of the CRT, timing of reading the character data out of the character memory should be in synchronism with vertical and horizontal synchronizing pulses which are used for displaying video pictures. On the other hand, the operation of the microcomputer is under control of a timing signal. Each function is carried out by executing instructions stored in a program memory, and the execution timing and time period of the program is determined by a machine cycle of the microcomputer. Accordingly, the reading timing of the character data which is under control of the execution timing of the program becomes asynchronous with the vertical and horizontal synchronizing pulses of the TV.

SUMMARY OF THE INVENTION

Therefore, an object of the present invention is to provide a microcomputer which can read the character data in synchronism with a timing signal different from the program-execution timing.

Another object of the present invention is to provide a microcomputer in which the same read only memory is employed as both of program memory and character memory.

Still another object of the present invention is to provide a microcomputer suitable for a television receiver in which characters are superimposed on video pictures on a display screen.

A microcomputer according to the present invention comprises a memory having a first area storing instructions to be executed and a second area storing character data, first means for making access to the first area to read the instruction therefrom, second means for executing the instruction read from the first area, third means responsive to a character-display-command for cyclically inhibiting the access to the first memory, fourth means for making access to the second area to read the character data therefrom during a period of time when the access to the first area is inhibited, storage means for temporarily storing the character data read from the second area, and fifth means responsive to a character data output command signal for receiving the character data stored in the storage means and for shifting the received character data in response to a shift clock.

The character data output command signal is generated in synchronism with vertical and horizontal synchronizing pulses. Before this command signal is generated, a plurality of character data to be displayed are read out of the second area of the memory and stored in the storage means. In other words, the fourth means and storage means operate to prefetch the character data to be displayed. Therefore, even when the character data output command signal is produced simultaneously with the access timing to the first area, the necessary character data which has already been stored in the storage means can be outputted. The instructions are cyclically read out of the first area during the character data output period. Thus, the microcomputer can execute the instructions in parallel to outputting the character data.

BRIEF DESCRIPTION OF THE DRAWINGS

The above and other objects, advantages and features of the present invention will be more apparent from the following description taken in conjunction with the accompanying drawings, in which FIG. 1 is a block diagram representative of an embodiment of the present invention;

FIG. 2 is a data map representative of a part of a character area shown in FIG. 1;

DETAILED DESCRIPTION OF THE EMBODIMENT

Figure 3:
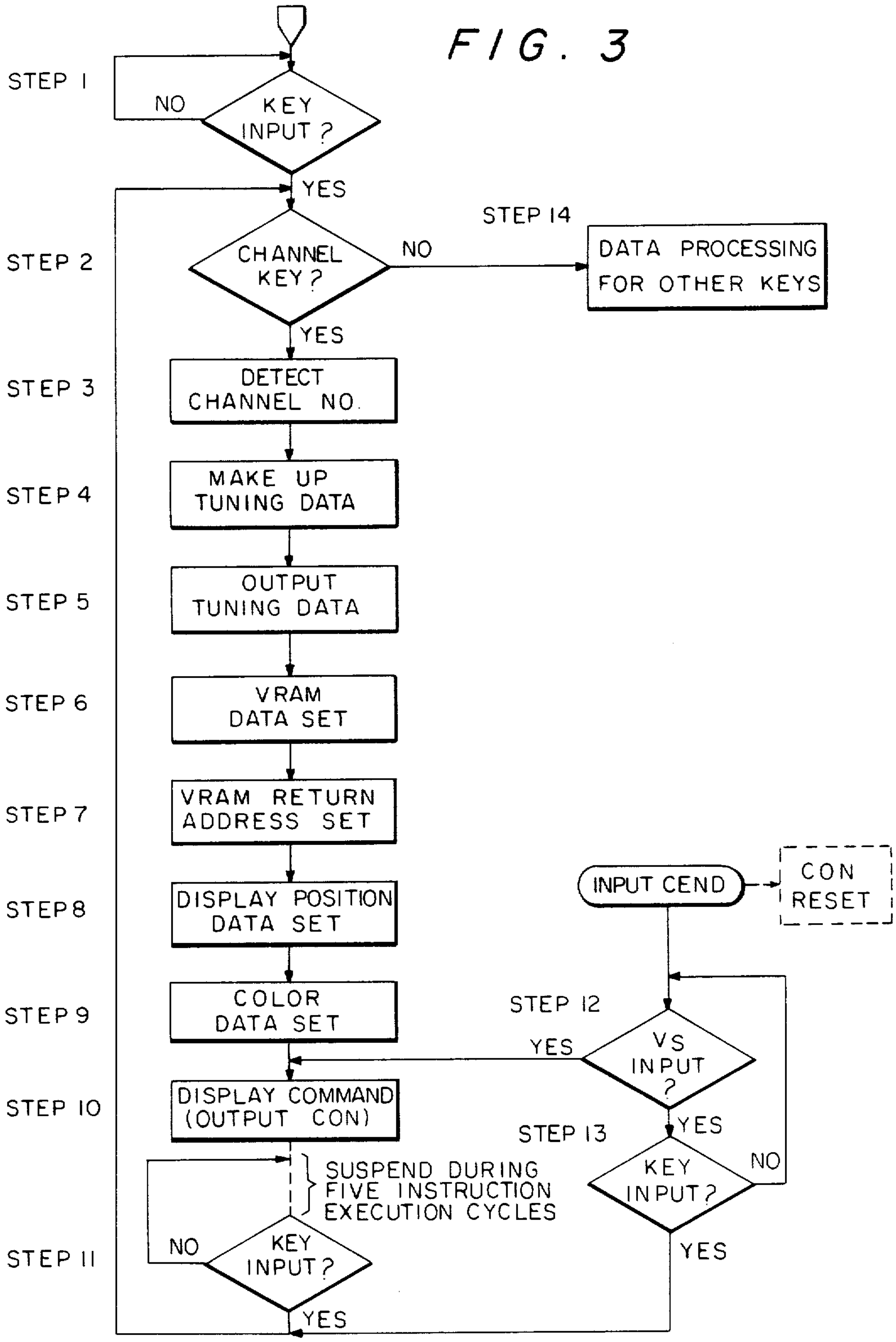
FIG. 3 is a program flow chart of a microcomputer shown in FIG. 1.

Referring to FIG. 1, a microcomputer 1 according to an embodiment of the present invention is employed for a digital control of a television receiver (TV) 50 and coupled between the TV 50 and a keyboard 60. The microcomputer 1 includes a central processing unit (CPU) 2, a read only memory (ROM) 4 and a random access memory (RAM) 5, which are interconnected via an internal address/data bus 30. The ROM 4 includes a first memory area represented as "program area 401" storing instructions of a program to be executed by the CPU 2 and further includes, in accordance with the present invention, a second memory area represented as "character area 402" storing data of characters which can be displayed on a display screen of a CRT 56 in the TV 50. In this embodiment, each character has a size of ten picture elements in a horizontal direction by sixteen picture elements in a vertical direction on the CRT 56. One picture element of the CRT 56 corresponds to one bit of the ROM 4. For example, as shown in FIG. 2, the character data of "0" are stored in the character area 402 from "1100(H)" address to "110F(H)" address, and the character data of "1" are stored in the area from "1110(H)" to "111F(H)" address. The mark "(H)" denotes hexadecimal representation. Other numerals, letters and symbols are also stored in the character area 402. The character data per one horizontal scan line of each character are stored from the first bit (least significant bit, i.e., LSB) to the tenth bit of one address. Since the data from the eleventh bit to the sixteenth bit (MSB) are not employed, the data stored therein may take "0" or "1" and therefore they are represented by a mark "X". The bits taking "1" from LSB to tenth bit form the character to be displayed on the CRT 56.

Turning back to FIG. 1, the access to the ROM 4 is carried out by a program counter 6 or a CROM pointer 17 under the control of a multiplexer (MPX) 18. When a character-display-command is not produced, a character display command signal CON, which will be described later, takes a low level, so that the MPX 18 selects the output of the program counter 6 and transfers it to the program area 401 of the ROM 4 to read an instruction at the address designated by the output of the program counter. The read out instruction is sent to the CPU 2 via the bus 30. The CPU 2 receives two system clock signals $C_1$ and $C_2$ and four machine cycle signals M0 to M3 from a system clock generator 3 and executes one instruction read out of the ROM 4 with four machine cycles M0 to M3. The generator 3 will be described later in detail. When the signal CON is in the low level, a multiplexer (MPX) 7 couples the address input of the RAM 5 to the bus 30, so that the CPU 2 makes access to the RAM 5 to write data thereinto or read data therefrom. The keyboard 60 includes channel selection keys for designating a desired channel number, volume control keys, timer setting keys, etc.

When the channel selection keys on the keyboard 60 are operated, the microcomputer 1 tunes the TV 50 so as to select a broadcasting station of the designated channel number and outputs character data signals for displaying the designated channel number on a desired position of the CRT 56. The program flow chart for this operation is shown in FIG. 3. In Step 1, it is detected whether or not the key of the keyboard 60 is operated. When the key is operated, it is detected which key has been operated (Step 2). Since the channel selection key is operated, the designated channel number is detected (Step 3). In case where the volume control key or the timer setting key is operated, the data processing operation responsive to the operated key is executed (Step 14). Assuming that the channel number "10" is designated, the tuning data for tuning the TV 50 to the broadcasing station of the channel number "10" are made up (Step 4) and then outputted to the TV 50 via an external data bus 31 (Step 5).

In the TV 50, a television signal processing circuit 52 selects the station of the channel number "10" received by an antenna 51 in response to the tuning data supplied thereto and detects the broadcasting wave signal. The circuit 52 further separates the detected signal into 9 sound information signal and a video information signal. The sound information signal is subjected to a sound detection to produce a sound signal $S_f$ which is in turn supplied to a loudspeaker 55. On the other hand, a vertical synchronizing pulse Vs and a horizontal synchronizing pulse Hs are picked out of the video information signal to produce vertical and horizontal diflection signals $V_R$ and $H_R$ which are in turn supplied to the CRT 56. Moreover, three primary color signals R, G and B are generated from the video information signal and supplied to the CRT 56 via a blanking control circuit 53 and an adder circuit 54. Thus, the video pictures and sound transferred from the station of the channel number "10" are reproduced.

In order to display the selected channel number "10" on the CRT 50, the microcomputer 1 executes successively the following operations shown in FIG. 3 during the turning operation of the TV 50. At first, the microcomputer 1 sets the starting address of the characters to be displayed, which are stored in the character area 402 of the ROM 4, at the RAM 5 (Step 6: VRAM Data Set). The RAM 5, which is employed by the CPU 2 as a data memory during the instruction execution, includes a VRAM area 501 in accordance with the present invention and the starting address of the characters are written into the VRAM area 501. Here, the leading address of the VRAM area 501 in the RAM 5 is designated to be "5000(H)". Since the characters to be displayed are "10(ten)", the starting address data "1110(H)" for the character "1(one)" is written into the "5000(H)" address location of the RAM 5 and the starting address data "1100(H)" for the character "0(zero)" into the "5001(H)" address location of the RAM 5. Moreover, the CPU 2 writes row end data, "FFFF(H)" for example, into the "5002(H)" address location of the RAM 5. The row end data represents the end of the character display per one row. In case where only the characters "10" are displayed within one picture, the data "FFFF(H)" is further written into the "5003(H)" address of the RAM 5. That is, the fact that the data "FFFF(H)" is written twice without a break represents the end of the character display per one picture. Thereafter, the CPU 2 writes return address data of the VRAM area into a stack register 8 (Step 7). In this embodiment, the first register SR1 of the stack register 8 stores the leading address data "5000(H)" of the VRAM area 501 and the second register SR2 stores the data "5003(H)". If a plurality of characters are displayed in a plurality of rows, a plurality of address data of the VRAM area 501 at which the starting address data of the starting character in the respective rows are stored are written into the stack register 8. Further, the address data of the VRAM area 501 at which the display end data "FFFF" is stored is also written into the stack register 8. It is required to set a display location of the characters on the CRT 56. For this purpose, the CPU 2 supplies display location information to a display clock generator 21 (Step 8 in FIG. 3). The display location information comprises a CRT display vertical location data, a CRT display horizontal location data, a character display vertical location data and a character display horizontal location data. The CRT display vertical and horizontal location data correspond respectively to the number of horizontal scan lines and the number of picture elements which denote a starting point of a video picture actually displayed by the CRT 56 against the video picture per one screen transferred from the broadcasting station. The character display vertical and horizontal location data designate respectively the vertical and horizontal starting points of the characters to be displayed on the CRT 56.

Figure 4:
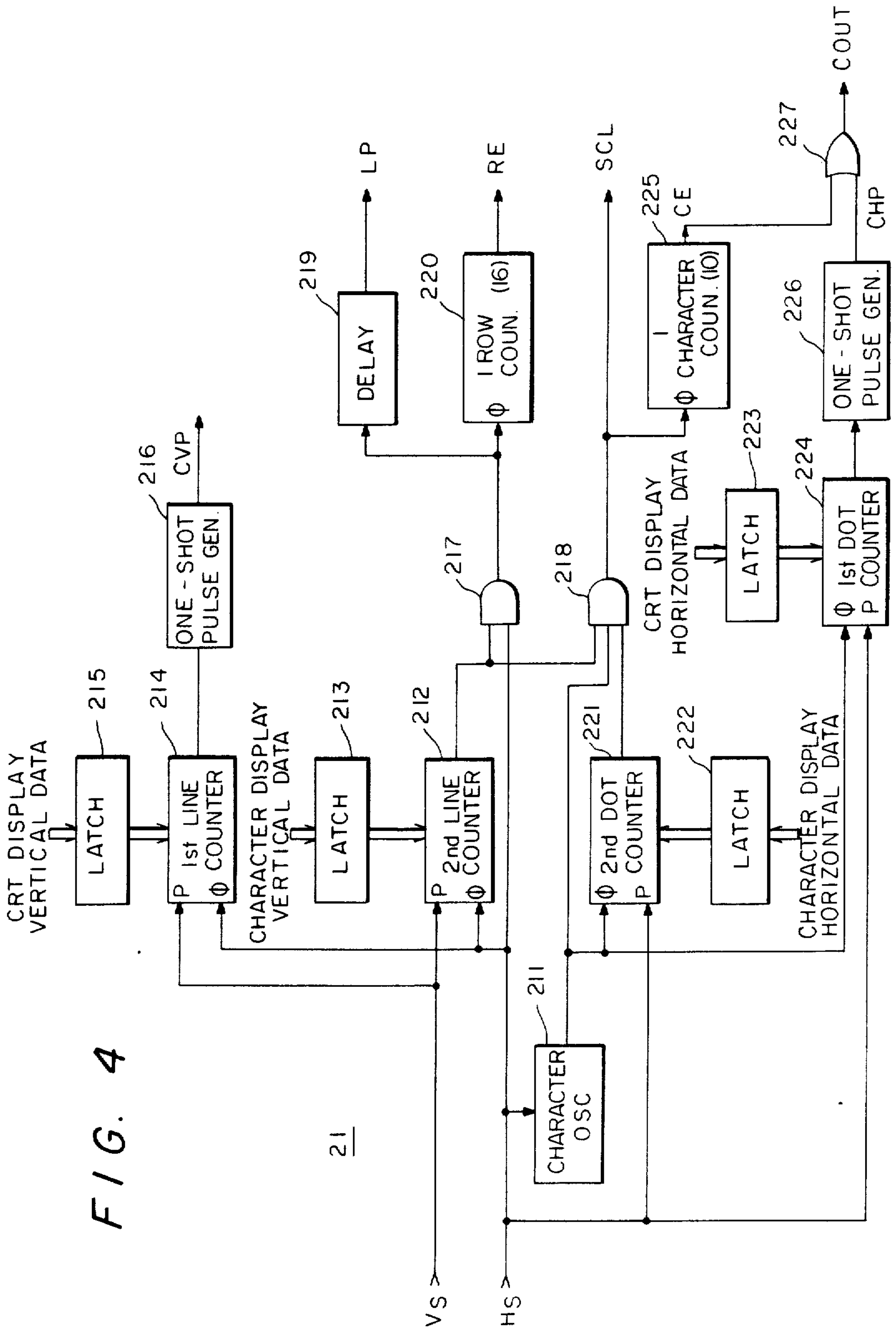
FIG. 4 is a block diagram representative of a display clock generator shown in FIG. 1.
Figure 5:
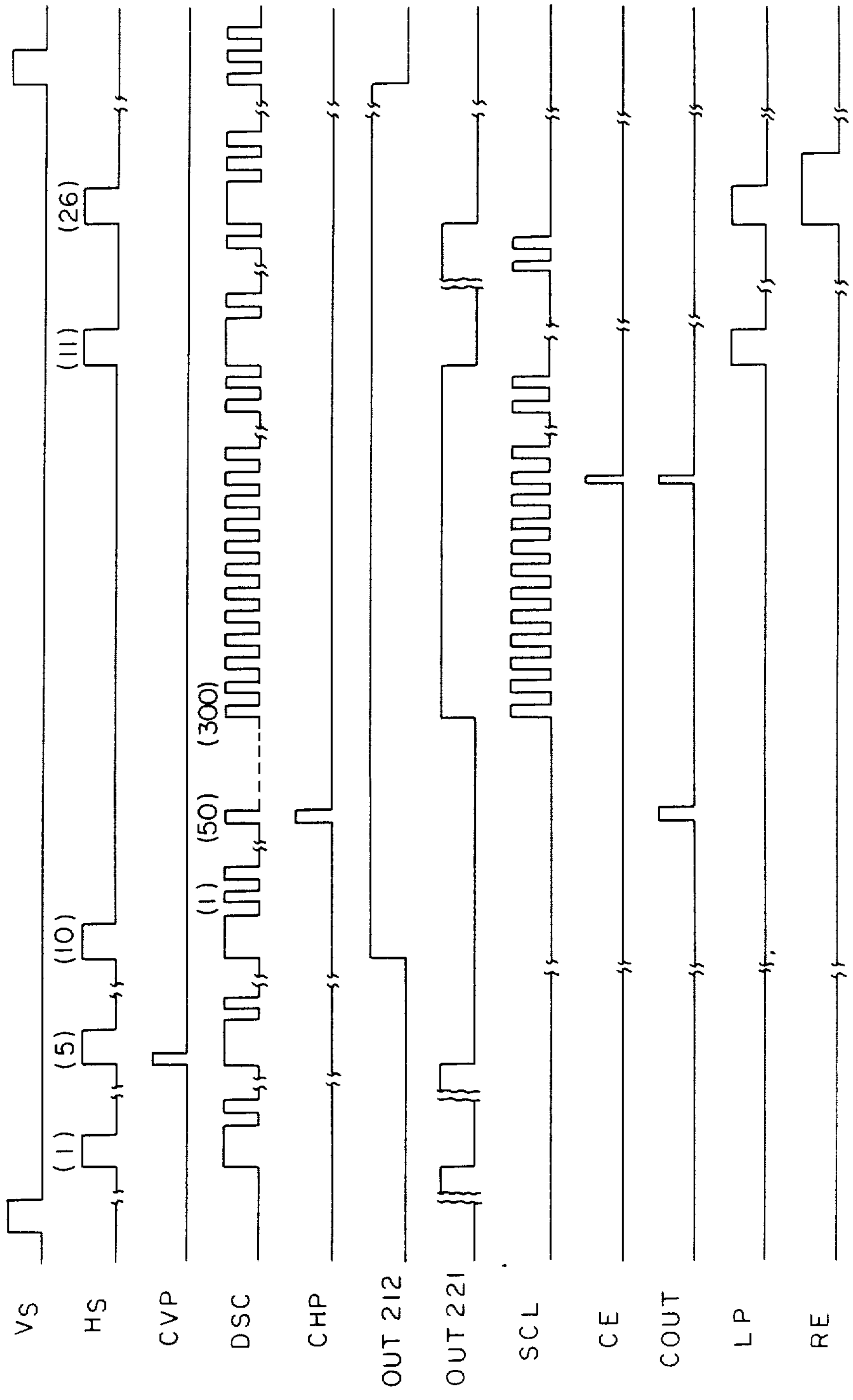
FIG. 5 is a timing chart representative of an operation of the display clock generator shown in FIG. 4.

Referring to FIG. 4, the display clock generator 21 includes four latch circuits 215, 223, 213 and 222 storing the CRT display vertical location data, the CRT display horizontal location data, the character display vertical location data and the character display horizontal location data supplied thereto, respectively. Assuming that the starting point of the video picture actually displayed by the CRT 56 corresponds to the fifth horizontal scan line in the vertical direction and the fiftieth picture element in the horizontal direction and the starting point of the displayed characters corresponds to the tenth horizontal scan line in the vertical direction and the three-hundredth picture element in the horizontal direction, the latch circuits 215, 223, 213 and 222 are supplied with data of "4", "49", "9" and "299", respectively. A character oscillator 211 is of a well-known synchronizing type, and therefore the output thereof is held at the high level during the high level period of the horizontal synchronizing pulse Hs and clock pulses are generated after a predetermined time passes from the falling edge of the pulse Hs, as shown in FIG. 5. One clock pulse from the oscillator 211 corresponds to one picture element of the CRT 56. The output of the oscillator 211 is supplied to the clock terminals $\phi$ of first and second dot counters 224 and 221, and the horizontal synchronizing pulse Hs is supplied to the clock terminal $\phi$ of first and second line counters 214 and 212. The counters 221 and 224 receive the data of the latch circuits 222 and 223 in synchronism with the horizontal synchronizing pulse Hs and the counters 212 and 214 receive the data of the latch circuits 213 and 215 in synchronism with the vertical synchronizing pulse Vs, respectively. Therefore, the output of the first line counter 214 changes to the high level by five horizontal synchronizing pulses Hs and returns to the low level in response to the vertical synchronizing pulse Vs, as shown in FIG. 5. In synchronism with the leading edge of the output of the counter 214, a pulse generator 216 generates a one-shot pulse CVP. The second line counter 212 produces the high level output by receiving ten horizontal synchronizing pulses Hs and its output changes to the low level by the vertical horizontal pulse Vs. The first dot counter 224 produces the high level output in response to the fiftieth pulse from the oscillator 211 and its output is changed to the low level in response to the horizontal synchronizing pulse Hs. A pulse generator 226 generates a one-shot pulse CHP in synchronism with the leading edge of the output of the counter 224. The second dot counter 221 changes the output to the high level by receiving three-hundred pulses from the oscillator 211 and its output returns to the low level in response to the horizontal synchronizing pulse Hs. The output of the second line counter 212 and the horizontal synchronizing pulse Hs are supplied to a two-input AND gate 217. The output of the second line counter 212, the clock pulses from the oscillator 211 and the output of the second dot counter 221 are supplied to a three-input AND gate 218. The output of the AND gate 217 is delayed by a delay circuit 219 by one horizontal period and then led out as a line pulse LP. The output of the AND gate 217 is further supplied to a one row counter 220. Since the size of one character in the vertical direction corresponds to sixteen picture elements (i.e., sixteen horizontal scan lines), the counter 220 is preset with the data of "16". That is, the counter 220 produces a one row display end pulse RE representative of the end of the character display per one row in synchronism with the leading edge of the seventeenth pulse from the AND gate 217. The output of the AND gate 218 is led out as a shift clock pulse SCL and supplied to a one-character counter 225. Since the size of one character in the horizontal direction corresponds to ten picture elements, the counter 225 is preset with the data of "10". Accordingly, the counter 225 produces a character end pulse CE representative of the end of the data display per one horizontal scan line of one character in synchronism with the leading edge of the eleventh pulse from the AND gate 218. The pulses CHP and CE are supplied to an OR gate 227 whose output is in turn led out as a character data output command signal COUT. Thus, the display clock generator 21 generates pulse signals CVP, CHP, RE, LP, CE and SCL required for a character display in synchronism with the vertical and horizontal synchronizing pulses Vs and Hs, as shown in FIG. 5.

Turning again back to FIGS. 1 and 3, the selection of the characters to be displayed and the setting of the data of the display starting position are now completed (Steps 6 to 8) and then the CPU 2 designates a color of the characters to be displayed (Step 9). To this end, the CPU 2 writes three-bit color data into a color data latch circuit 24 (FIG. 1). When the color of the character to be displayed is white, the color data takes a value of "111". The color data of "010" is written into the latch circuit 24, when green color characters are displayed. The program counter 6 designates the address of the program area 401 where an instruction representative of a character display command is stored, and the CPU 2 executes the instruction of this command. As a result, the character display command signal CON changes to the high level (Step 10). In response to the high level signal CON, the MPX 7 disconnects the address input of the RAM 5 from the bus 30 and connects it to a VRAM pointer 9 and the MPX 18 for the RAM 4 selects the CROM pointer 17 and transfers its output to the address input of the RAM 4. Therefore, the access to the ROM 4 by the program counter 6 is inhibited and the access to the RAM 5 by the address data on the bus 30 is inhibited. Namely, the CPU 2 suspends the program execution. However, the key input from the keyboard 60 has to be accepted even when the program execution is suspended. Accordingly, the high level of the character display command signal CON is not maintained long but is returned cyclically to the low level to allow the program counter 6 to make access to the ROM 4. In this embodiment, the high level period of the character display command signal CON is designed to be five times of one-instruction execution cycle period of the CPU 2, and the low level period thereof is designed to be one-instruction execution cycle period. As shown by a Step 11 in FIG. 3, therefore, the program counter 6 makes access to the ROM 4 and the CPU 2 executes a judge instruction to detect whether a key input is present every time period corresponding to five instruction execution cycles.

Figure 6:
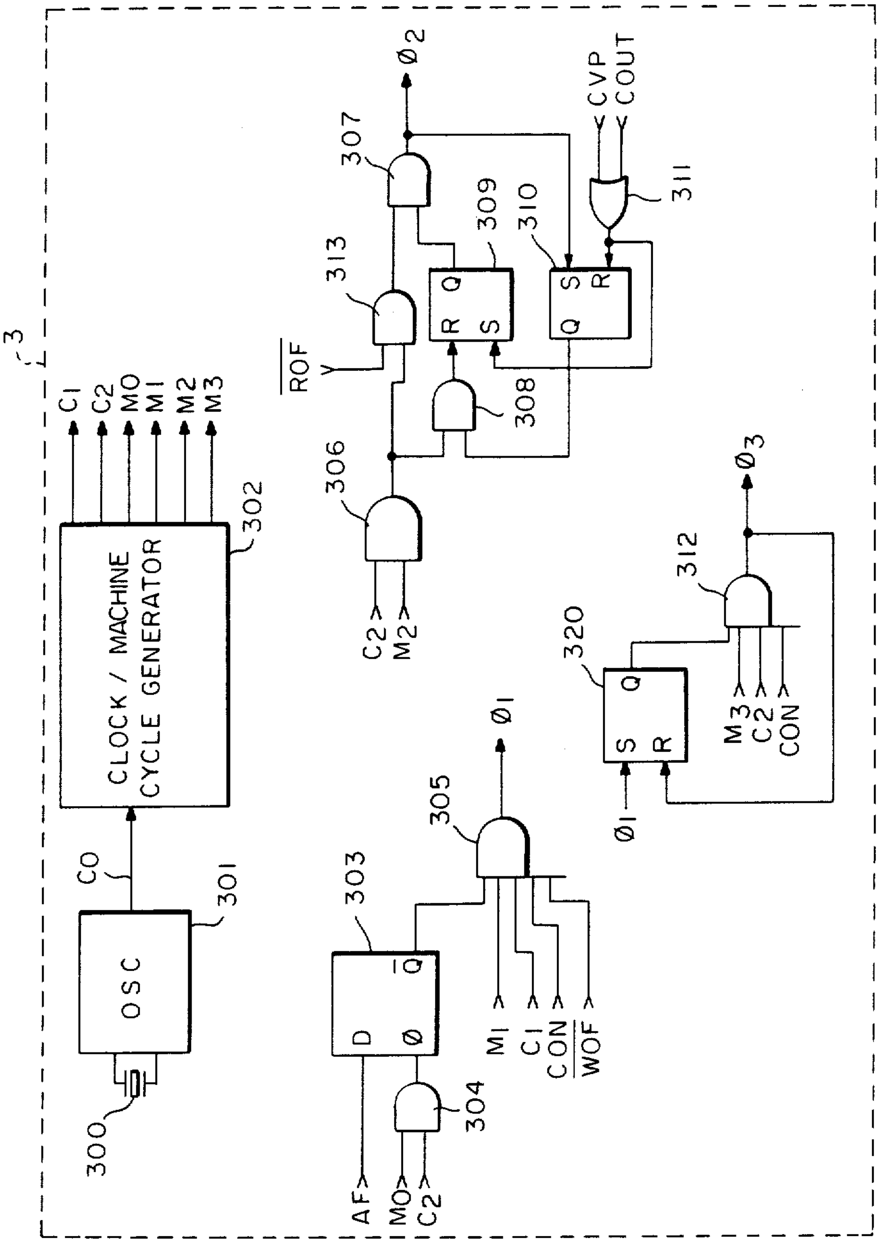
FIG. 6 is a block diagram representative of a system clock generator shown in FIG. 1.
Figure 7:
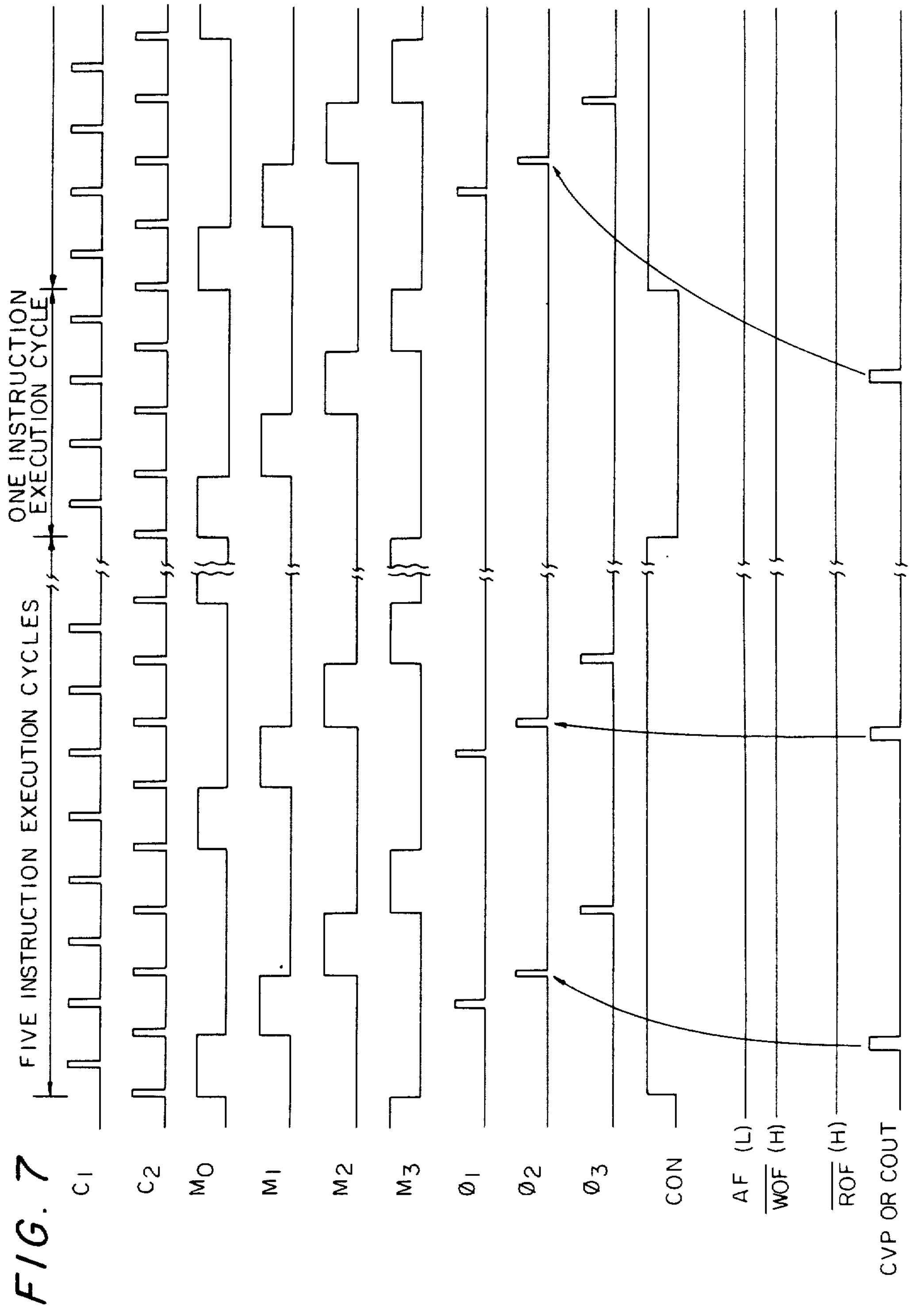
FIG. 7 is a timing chart representative of an operation of the system clock generator shown in FIG. 6.

The character display command signal CON returning cyclically to the low level can be generated by employing the machine cycle signals M0 to M3 from the system clock generator 3. Referring to FIG. 6, the clock generator 3 includes an oscillator 301 which cooperates with a crystal resonator 300 to generate an oscillation signal Co of a predetermined frequency. A system clock/machine cycle generator 302 responds to this oscillation signal Co to generate the system clocks $C_1$ and $C_2$ and the machine cycle signals M0 to M3 as shown in FIG. 7. The CPU 2 executes one instruction in four machine cycles M0 to M3. Accordingly, the character display command signal CON can be generated by a counter (not shown) responsive to the machine cycle signals M0 to M3. The clock generator 3 further generates a first latch clock $\phi_1$ supplied to a first-in first-out memory (FIF0 memory) 19 (FIG. 1), a second latch clock $\phi_2$ supplied to a pattern latch circuit 20 and an increment clock $\phi_3$ supplied to the VRAM pointer 9. The latch clock $\phi_1$ is generated by a D-type flip-flop (D-F/F) 303, a two-input AND gate 304 and a five-input AND gate 305 which are connected and supplied with control signals as shown. Among these control signals, a signal $\overline{WOF}$ is an inverted signal of a signal WOF generated by the F1F0 memory 19 which has five memory areas F, $F_2$, $F_3$, $F_4$ and $F_5$. The signal WOF takes the high level when all the five areas $F_1$–$F_5$ of the F1F0 memory 19 store data. A signal AF takes the high level when a data detector 15 (FIG. 1) detects that all the bits of the data transferred from the bus 30 are "1". Accordingly, when the signals CON, $\overline{WOF}$ and AF take the high level, high level and low level, respectively, the latch clock $\phi_1$ is generated in synchronism with the system clock C1 during the second machine cycle M1, as shown in FIG. 7. The second latch clock $\phi_2$ is generated by four AND gates 306, 307, 308 and 313, two S-R type flip-flop (SR-F/F) 309 and 310 and one OR gate 311 which are connected as shown in FIG. 6. The OR gate 311 is supplied with the pulses CVP and COUT described with reference to FIGS. 4 and 5. A signal $\overline{ROF}$ is an inverted signal of a signal ROF generated by the F1F0 memory 19, the signal ROF taking the high level when all the data stored in the F1F0 memory 19 are read out. Accordingly, the pulse CVP or COUT is supplied in the state of the high level signal $\overline{ROF}$, the latch clock $\phi_2$ is generated in synchronism with the system clock $C_2$ during the third machine cycle M2, as shown in FIG. 7. The clock $\phi_2$ is not generated unless the pulse CVP or COUT is supplied again. When the signal $\overline{ROF}$ changes to the low level, the latch clock $\phi_2$ is not generated. The increment clock $\phi_3$ is generated by a three-input AND gate 312 and an SR-F/F 320 in synchronism with the system clock $C_1$ during the fourth machine cycle M3 after the generation of the first latch clock $\phi_1$.

Figure 8:
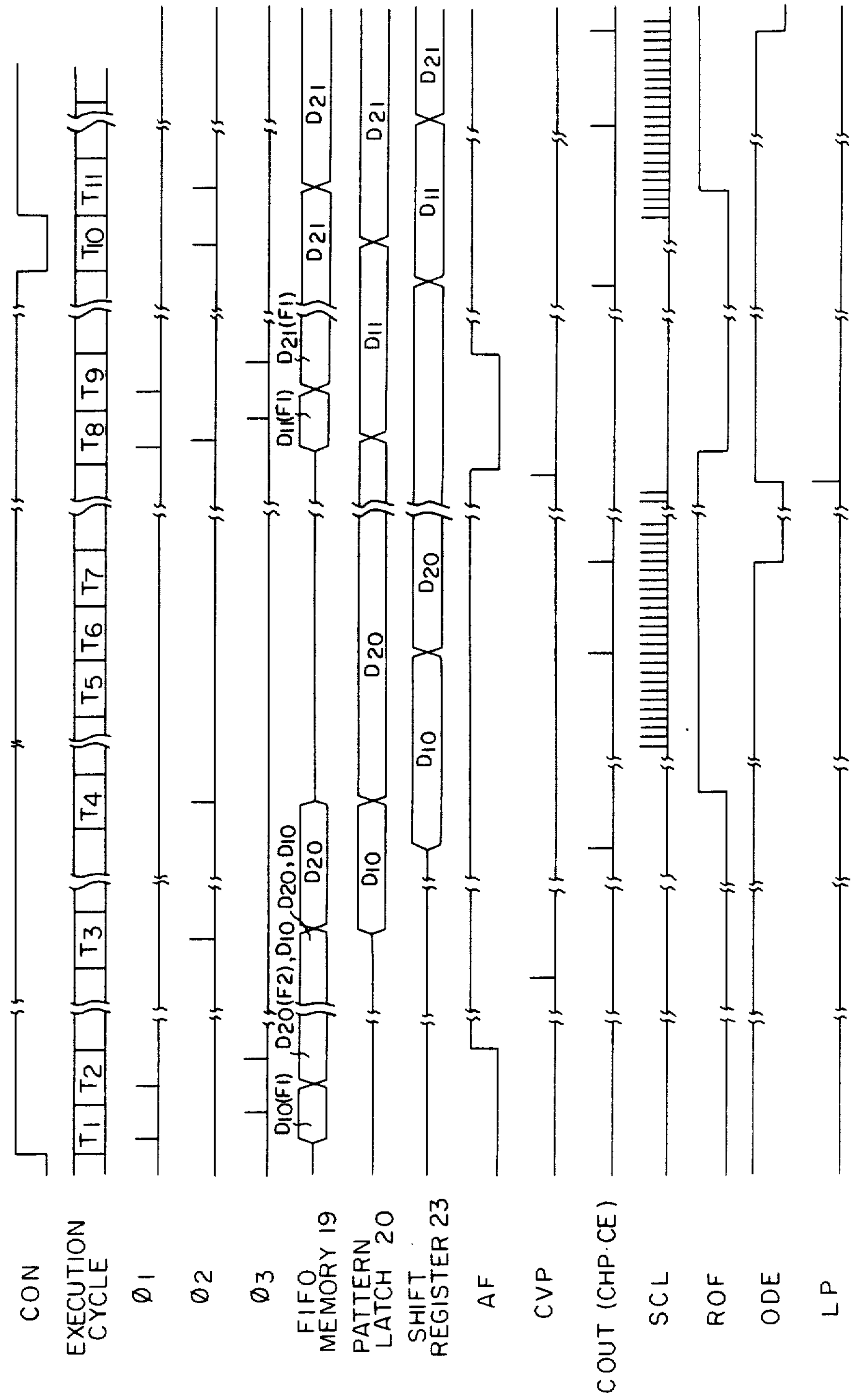
FIG. 8 is a timing chart representative of one example of a character display operation in FIG. 1.

Next, a character display operation will be described with reference to FIGS. 1, 3 and 8. When the character display command signal CON takes the high level, the MPX 7 selects the VRAM pointer 9 which is preset with the starting address data "5000(H)" of the VRAM area 501. Accordingly, the 16-bit data "1110(H)" stored in the starting address "5000(H)" of the VRAM area 501 is read therefrom to the 16-bit bus 30. The CROM pointer 17 includes a 12-bit data latch 171 receiving a 12-bit data from a 12-bit branch bus 131 and a 4-bit counter 172 and outputs a 16-bit address data. As shown in FIG. 2, the data of each one of the characters are stored in successive sixteen address locations of the character area 402 in the ROM 4, and the more significant twelve bits among 16-bit addresses designating these sixteen address locations are equal to one another. On the other hand, the remaining less significant four bits are different from one another and incremented one by one from the value of the starting address location. The character data per one address location is displayed during one horizontal scan line period. Therefore, the more significant twelve bits among the 16-bit starting address data read out of the RAM 5, i.e. "111 (H)", are transferred to the 12-bit branch bus 131 and latched in the 12-bit latch 171 of the CROM pointer 17. The content of the 4-bit counter 172 of the CROM pointer 17 is initialized to have a 4-bit data "0000" and incremented by one every one horizontal scan line, i.e. every application of the line pulse LP thereto from the display clock generator 21. The CROM pointer 17 outputs the 16-bit address data "1110(H)" by combining the content of the 12 bit latch 171 as the more significant 12-bit with the content of the 4-bit counter 172 as the less significant 4-bit and sends it to the address input of the ROM 4 via the MPX 18. Thus, in synchronism with the clock C1 during the second machine cycle M1 in an execution cycle $T_1$ shown in FIG. 8, the 16-bit data stored in the "1110(H)" starting address location of the ROM 4, "XXXX XX00 0111 0000", is read out of its character area 401 to the 16-bit bus 30. The first latch clock $\phi_1$ is generated simultaneously. As a result, the less significant ten bits data $D_{10}$ among the read-out data, i.e., "00 0111 0000", is written via the 10-bit branch line 119 into a first memory area F1 of the F1F0 memory 19, as shown in FIG. 8. Since the signal CON takes the high level during a period corresponding to five instruction execution cycles, the F1F0 memory 19 includes five areas $F_1$ to $F_5$. Since the tuning operation of the TV 50 is not completed, the pulses CVP and COUT are not generated, so that the second latch clock $\phi_2$ is not generated. Thus, the data per one horizontal scan line of the character "1" is prefetched into the F1F0 memory 19 during the cycle T1. The increment clock $\phi_3$ is generated in synchronism with the clock $C_2$ during the fourth machine cycle M3 in the cycle T1 and then supplied to the clock terminal $\phi$ of the VRAM pointer 9 via an AND gate 11. The data of the pointer 9 is thereby changed to "5001(H)", so that the 16-bit data "1100(H)" stored at the "5001(H)" address location of the RAM 5 is outputted to the 16-bit bus 30. The more significant twelve bits among the read out 16-bit data "1100(H)", i.e. "110 (H)", are transferred to the 12-bit branch bus 131 and stored into the latch 171 of the CROM pointer 17. The content of the counter part 172 is still "0 (H)". Accordingly, the data "XXXX XX00 1111 1100" at the starting address "1100(H)" of the ROM 4 is outputted to the bus 30 in synchronism with the clock $C_1$ during the second machine cycle $M_1$ in an execution cycle $T_2$ shown in FIG. 8, and the less significant ten bits data $D_{20}$ "00 1111 1100", is stored into the second memory area F2 of the F1F0 memory 19. The increment clock $\phi_3$ changes the data of the VRAM pointer 9 to "5002(H)", so that the data of "FFFF(H)" is read out of the RAM 5. The all "1" detector 15 detects it and produces the high level signal AF as shown in FIG. 8 to set an SR-F/F 16. Therefore, the latch clock $\phi_1$ to the F1F0 memory 19 is not generated to prevent the F1F0 memory 19 from storing undesired data. Since the AND gate 11 is closed by the $\overline{Q}$ output (logic 0) of the SR-F/F 16, the increment clock $\phi_3$ is not supplied to the VRAM pointer 9. Namely, the output data of the pointer 9 does not change. Thus, the first character data per one horizontal scan line for the characters "10 (ten)" are prefetched into the F1F0 memory 19.

When the TV 50 is tuned to the channel number "10", the vertical and horizontal synchronizing pulses Vs and Hs are supplied to the display clock generator 21 to activate it. As discussed hereinbefore, the pulse CVP is generated at first, so that the second latch clock $\phi_2$ is generated in synchronism with the clock $C_2$ during the third machine cycle M2 in an execution cycle T3 shown in FIG. 8. In response to the latch clock $\phi_2$, the pattern latch circuit 20 latches the data $D_{10}$ stored in the first area F1 of the F1F0 memory 19. When the character oscillator 211 (FIG. 3) generates fifth pulses, the pulse CHP, i.e. the character data output command pulse COUT, is generated, so that a shift register 23 receives the data $D_{10}$ of the pattern latch 20 in synchronism with the leading edge of the pulse COUT, as shown in FIG. 8. Since the pulse COUT is generated, the second latch clock $\phi_2$ is generated again is synchronism with the clock $C_2$ during the third machine cycle M2 in an execution cycle $T_4$. The data $D_{20}$ stored in the second area F2 of the F1F0 memory 19 is thereby latched into the pattern latch circuit 20. The F1F0 memory 19 produces the high level signal ROF, and therefore the clock $\phi_2$ is not generated until new character data is written into the F1F0 memory 19.

When ten horizontal synchronizing pulses Hs are supplied and the OSC 211 produces three-hundred pulses, the shift clock pulses SCL are generated as shown in FIG. 8. Thus, the data $D_{10}$ of the shift register 23 is outputted one bit by one bit in synchronism with the falling edge of each shift clock pulse SCL. Since an AND gate 40 is open, the output of the shift register 23 is supplied as a blanking control signal BLC to the blanking control circuit 53 in the TV 50. During the high level period of the signal BLC, the control circuit 53 changes its output to the low level irrespective of the primary color signals R, G and B. The output of the AND gate 40 is further supplied to the respective first input nodes of AND gates 25, 26 and 27 whose second input nodes are supplied with data signals from the color data circuit 24. The outputs of the AND gates 25, 26 and 27 are supplied as character color signals RC, RG and RB to the adder circuit 54 in the TV 50 wherein the character color signals RC, RG and RB are added to the outputs of the blanking control circuit 53 and then supplied to the CRT 56. When all the signals RC, RG and RB take logic 1, a white color is displayed on the CRT 56. When only the signal RG takes logic 1, a green color is displayed on the CRT 56.

By the generation of ten shift clock pulses SCL, all the bits data of the shift register 23 are outputted. That is, the first character data D10 per one horizontal scan line of the character "1" is outputted. Since the character end pulse CE is generated by the eleventh shift clock pulse SCL, the data D20 of the pattern latch 20 is transferred into the shift register 23 and then outputted one bit by one bit in synchronism with the falling edge of each shift clock pulse SCL. As a result, the first character data D20 per one horizontal scan line of the character "0" is outputted. When the data output is completed, the character end pulse CE is generated again in an execution cycle T7 shown in FIG. 8. Since the signals ROF and AF are in the high level, an AND gate 41 and two D-F/Fs 42 and 43 changes an output control signal ODE to the low level in response to the second generation of the character end pulse CE. The AND gate 40 is thereby closed and the CRT 56 reproduces the video picture from the broadcasting station.

Simultaneously with the arrival of the horizontal synchronizing pulse Hs, the line pulse LP is generated as shown in FIG. 8. The content of the counter part 172 of the CROM pointer 17 is incremented by one to change a value of "1(H)" in synchronism with the falling edge of the line pulse LP. The SR-F/F is reset. Since a stack pointer 10 designates the first register SR1 of the stack register 8, the data of "5000(H)" is set into the VRAM pointer 9 in response to the falling edge of the line pulse LP. The 16-bit data of "1110(H)" is thereby read out of the RAM 5, and the more significant twelve bits among the read out 16-bit data, i.e. "111 (H)", are stored in the latch 171 of the CROM pointer 17. The content of the counter part 172 is "1 (H)". Therefore, the address data "1111(H)" is supplied from the CROM pointer 17 to the ROM 4. The signal AF changes to the low level. The data of "XXXX XX00 0111 0000" is thereby read from the ROM 4 and the less significant ten bits data $D_{11}$ thereof, i.e. "00 0111 0000", is written into the first area F1 of the F1F0 memory 19 in response to the latch clock $\phi_1$ in an execution cycle $T_8$. The F1F0 memory 19 changes the signal ROF to the low level. Since the SR-F/F 309 is in the set state, the latch clock $\phi_2$ is generated in the cycle $T_8$, so that the data $D_{11}$ of the area F1 of the F1F0 memory 19 is latched into the pattern latch circuit 20. The increment clock $\phi_3$ changes the content of the VRAM pointer 9 by one to make access to the "5001(H)" address location of the RAM 5 at which the data of "1100(H)" is stored. As a result, the data of the "1101(H)" address location of the ROM 4, i.e. "XXXX XX01 1111 1110", is read therefrom. The less significant ten bits data $D_{21}$ of the read-out data, "01 1111 1110", is written into the first area F1 of the F1F0 memory 19 in response to the latch clock $\phi_1$ in an execution cycle $T_9$. Since the SR-F/F 309 (FIG. 6) is reset and since the pulse CVP or COUT is not arrived, the latch clock $\phi_2$ is not generated in the cycle $T_9$. The data of the VRAM pointer 9 is changed to "5002(H)" by the increment clock $\phi_3$, so that the data of "FFFF(H)" is outputted from the RAM 5. Thus, the character data $D_{11}$ and $D_{21}$ in the second line of the characters "10 (ten)" are prefetched in the latch circuit 20 and the F1F0 memory 19, respectively, before the pulse CHP is generated. When the pulse CHP is thereafter generated to produce the character data output command pulse COUT, as shown in FIG. 8, the shift register 23 receives the data $D_{11}$ of the pattern latch circuit 20. The latch clock $\phi_2$ appears in an execution cycle $T_{10}$, so that the data $D_{21}$ stored in the area F1 of the F1F0 memory 19 is latched by the pattern latch circuit 20. The F1F0 memory 19 changes the signal ROF to the high level. The data $D_{11}$ of the shift register 23 is outputted one bit by one bit in response to each shift clock pulse SCL from the generator 21. The AND gate 40 is in the open state, since the D-F/Fs 42 and 43 are reset by the horizontal synchronizing pulse Hs. Accordingly, the high level output of the shift register 23 changes the primary color signals R, G and B to the low level, and the character color signals CR, CG and CB are superimposed on the video picture. When the second line character data $D_{11}$ for the character "1 (one)" is outputted, the character end pulse CE is generated. The second line data $D_{21}$ of the character "0 (zero)" is thereby transferred into the shift register 23 and then outputted one bit by one bit. When the pulse CE is generated again, the gate 40 is closed.

The above operation is repeated until the seventeenth horizontal synchronizing pulse Hs arrives, so that the selected channel number "10" is displayed on the CRT at a predetermined position. The one row display end pulse RE is generated in response to the seventeenth horizontal synchronizing pulse Hs. This pulse RE increments the content of the stack pointer 10 to designate the second register $SR_2$ of the stack register 8. Therefore, the address data of "5003(H)" is supplied to the VRAM pointer 9. The pulse RE is further supplied to the clock terminal $\overline{\phi}$ of a D-F/F 14 and the reset terminal $\overline{R}$ of the counter part 172 of the CROM pointer 17. Since the data terminal D of the D-F/F 14 is supplied with the high level signal AF, the output $\overline{Q}$ thereof changes to the high level in response to the falling edge of the pulse RE. The counter 172 is reset by the falling edge of the pulse RE. The VRAM pointer 9 catches the address data "5003(H)" from the stack register 8 in response to the falling edge of the line pulse LP which is generated simultaneously with the pulse RE. The falling edge of the pulse RE appears later than that of the pulse LP. The "5003(H)" address location of the RAM 5 stores data of "FFFF(H)". The data detector 15 therefore holds the high level signal AF. As a result, an AND gate 13 generates a character display end signal CEND representative of the display end of all characters per one video picture. This signal CEND is supplied to the CPU 2 to reset the character display command signal CON. The signal CON is thereby held at the low level. As a result, the MPX 18 connects the output of the program counter 6 to the address input of the ROM 4 and the MPX 7 connects the bus 30 to the address input of the RAM 5.

As shown in FIG. 3, the CPU 2 executes a judge instruction (Step 12) to detect whether the vertical synchronizing pulse Vs arrives in response to the character display end signal CEND. If the vertical synchronizing pulse Vs does not arrive, another judge instruction is executed to detect whether or not an key input is present (Step 13). The arrival of the vertical synchronizing pulse Vs indicates the starting of a next video picture, and therefore the program jumps to the Step 10 to execute the character display command signal (CON) output processing operation. The above-mentioned character display operation is thereby executed. When the key input is detected in the Step 11 or 13, the program jumps to the Step 2.

Thus, the microcomputer 1 executes both program operation and character display operation which synchronous with each other.

Figure 9:
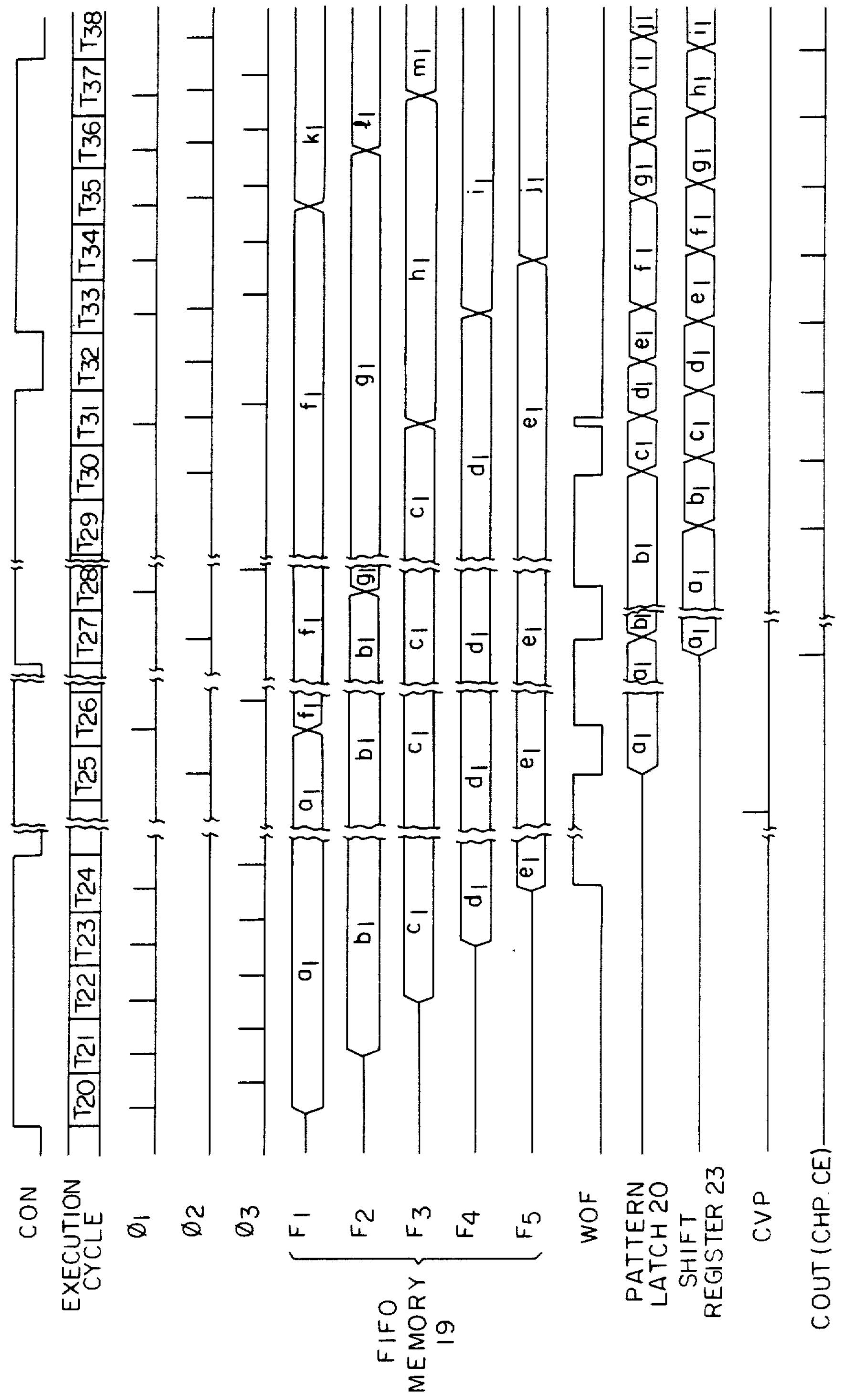
FIG. 9 is a timing chart representative of another example of a character display operation in FIG. 1.

The microcomputer 1 according to the present invention presents remarkable advantages when characters more than four are displayed in one row. Assume that fourteen characters "a" to "n" are displayed in that order in one row. As shown in FIG. 9, during five execution cycles $T_{20}$ to $T_{24}$ responsive to the generation of the character display command signal CON, the first line character data al, bl, cl, dl and el for the characters "a", "b", "c", "d" and "e" are written into the areas F1, F2, F3, F4 and F5 of the F1F0 memory 19, respectively. Since the F1F0 memory 19 produces the high level signal WOF, the latch clock $\phi_1$ and the increment clock $\phi_3$ are no longer generated. Accordingly, the output data of the VRAM pointer 9 is held to designate the address location of the RAM 5 in which the starting address designating the character data for "f" in the ROM 4 is stored. When the display clock generator 21 generates the pulse CVP as shown in FIG. 9, the latch clock $\phi_2$ is generated in an execution cycle $T_{25}$, so that the pattern latch 20 latches the data $a_1$ of the area F1 of the F1F0 memory 19. Since the F1F0 memory 19 changes the signal WOF to the low level, the latch clock $\phi_1$ is generated in an execution cycle $T_{26}$, so that the first line data $f_1$ for the character "f" is written into the first area F1 of the F1F0 memory 19. Since the F1F0 memory 19 produces again the high level signal WOF, the output data of the VRAM pointer 9 is held at a next address data of the VRAM area 501. Since the clock generator 21 thereafter generates the pulse CHP, as shown in FIG. 9, the shift register 23 receives the data $a_1$ of the pattern latch 20. The latch clock $\phi_2$ is generated in an execution cycle $T_{27}$, so that the pattern latch 20 stores the data $b_l$ of the second area F2 of the F1F0 memory 19. By the generation of the latch clock $\phi_1$ in an execution cycle $T_{28}$, the first line data $g_1$ of the character "g" is written into the second area F2 of the F1F0 memory 19. The display clock generator 21 starts to generate the shift clock pulses SCL in an execution cycle $T_{29}$, for example, as shown in FIG. 9. The data $a_1$ of the shift register 23 is outputted one bit by one bit in response to each shift clock pulse SCL. The character end pulse CE is thereafter generated, so that the data $b_1$ of the pattern latch 20 is stored into the shift register 23 and then outputted one bit by one bit. Since the latch clock $\phi_2$ is generated in an execution cycle $T_{30}$, the data cl of the area F3 is latched into the pattern latch 20. The latch clock $\phi_1$ is generated in an execution cycle $T_{31}$, so that the first line data $h_1$ of the character "h" is written into the third area F3 of the F1F0 memory 10. By the pulse CE representative of the output end of the data $b_1$, the data $c_1$ of the pattern latch 20 is transferred into the shift register 23 and then outputted. The above operations are repeated as shown in FIG. 9. When the character display command signal CON changes to the low level during one execution cycle, as shown by the cycles $T_{32}$ and $T_{38}$ in FIG. 9, the CROM pointer 17 is inhibited to make access to the character area 402 of the ROM 4. However, a plurality of character data are prefetched into the F1F0 memory, and therefore the character data are outputted successively. When the data "FFFF(H)" representative of the end of one row character display is read from the RAM 5, the VRAM pointer 9 and CROM pointer 17 stop to operate. After the first line data $n_1$ of the character "n" is outputted, the AND gate 40 is closed. When the horizontal synchronizing pulse Hs thereafter arrives, the second line data $a_1$ to $e_1$ of the characters "a" to "e" are prefetched into the F1F0 memory 19, and the above operations are then repeated. In this embodiment, a time of one instruction execution cycle is 2 μsec, whereas the character end pulse CE is generated every 2.5 μsec. The signal CON has a cycle period of 12 μsec and is held at the high level during a period of 10 μsec. Accordingly, even in the case where a plurality of characters are displayed successively, at least one character data remains in the F1F0 memory 19. Thus, the character display is not broken.

The present invention is not limited to the above embodiments, but may be modified and changed without depasting from the scope and spirit of the invention.

What is claimed is:

1. A microcomputer comprising:

a memory including a first area storing a plurality of instructions and a second area storing character data, first means for making access to said first area to read an instruction, second means for executing said instruction read from said first area, said second means including means for generating a character display command signal by executing said instruction read from said first area, said character display command signal changing between a first state and a second state in a predetermined cycle, third means, including first storage means, for temporarily storing address information for reading said character data from said second area, fourth means, responsive to said character display command signal, for coupling said first means to said memory to allow said first means to read said instruction from said first area when said character display command signal is in said first state and for coupling said third means to said memory to allow said third means to access said second area when said character display command signal is in said second state, said character data being read from an address location in said second area designated by said address information when said access to said second area is allowed, second storage means for temporarily storing character data read from said second area, and fifth means for receiving character data stored in said second storage means in response to a character data output command signal and for shifting received character data in response to a shift clock, wherein said second means suspends execution of instructions during a term in which said character display command signal is in said second state and resumes execution of instructions in response to a change of said character display command signal to said first state.

2. The microcomputer as claimed in claim 1, wherein said fourth means includes a multiplexer which couples said first means to said memory when said character display command signal is in said first state, said multiplexer coupling said third means to said memory when said character display command signal is in said second state.

3. The microcomputer as claimed in claim 2, wherein the time period of said first state of said character display command signal is shorter than the time period of said second state.

4. The microcomputer as claimed in claim 1, wherein said second means includes a first-in first-out memory.

5. A microcomputer comprising:

a first memory storing a plurality of instructions and a plurality of character data, first means for accessing said first memory to read a selected number of said instructions therefrom, an execution unit executing instructions read from said first memory, said execution unit including means responsive to a certain instruction read out from said first memory for generating a control signal changing between a first state and a second state in a predetermined cycle, second means for inhibiting said first means from accessing said first memory to cause said execution unit to suspend execution of instructions during said second state of said control signal and for allowing said first means to access said first memory to cause said execution unit to resume execution of instructions during said first state of said control signal, a second memory storing address information of character data to be outputted, third means for reading said address information from said second memory during said second state of said control signal, fourth means responsive to said address information read from said second memory for reading character data from said first memory during said second state of said control signal, a third memory for temporarily storing character data read from said first memory, means for generating a shift clock pulse, a shift register outputting data stored therein in response to said shift clock pulse, and means for transferring character data stored in said third memory to said shift register.

6. The microcomputer as claimed in claim 5, wherein said second memory further stores data to be processed by said execution unit, said execution unit making access to said second memory during said first state of said control signal to write said address information into said second memory.

7. A microcomputer for producing character data representative of a character to be displayed on a screen of a cathode ray tube, said microcomputer comprising:

a memory having a first area storing a plurality of instructions and a second area storing said character data, an execution unit executing each instruction read out from said first area of said memory, a program counter designating an address location of said first area into which an instruction to be executed by said execution unit is stored, a character pointer designating an address location of said second area into which character data to be outputted is stored, said execution unit further including means, responsive to a certain instruction read out from said first area, for generating a control signal changing between a first state and a second state in a predetermined cycle, means, coupled to said memory, said program counter and said character pointer and responsive to said control signal, for accessing said first area of said memory utilizing said program counter to read out an instruction therefrom during said first state of said control signal and for accessing said second area of said memory utilizing said character pointer to read out character data therefrom during said second state of said control signal, storage means for temporarily storing said character data read from said second area of said memory, position detecting means, responsive to vertical and horizontal synchronizing signals derived from said cathode ray tube, for detecting a position of said screen on which said character is to be displayed and for producing a detection signal, means, responsive to said detection signal, for producing a shift clock pulse, a shift register shifting and outputting data stored therein in synchronism with said shift clock pulse, and means for transferring said character data stored in said storage means to said shift register.

8. A microcomputer as claimed in claim 7, wherein said position detecting means includes a data latch means for latching position data representative of said position and wherein said execution unit writes said position data into said data latch by executing an instruction read out from said first area of said memory.

9. A microcomputer as claimed in claim 7, further comprising means for producing a character display end signal after said character is displayed on said screen of said cathode ray tube and means responsive to said character display end signal for holding said control signal in said first state.

10. A microcomputer as claimed in claim 7, wherein said memory includes a read only memory and said microcomputer further comprises a read/write memory having a third area for storing data for said execution unit and a fourth area for storing character address information, a video memory pointer designating areas of said fourth area of said read/write memory, means for allowing said execution unit to access said third and fourth areas of said read/write memory during said first state of said control signal, means for accessing said fourth area of said read/write memory utilizing said video memory pointer to read out character address information therefrom during said second state of said control signal, and means for transferring character address information read out from said fourth area of said read/write memory to said character pointer during said second state of said control signal.

* * * * *